Figure 1:
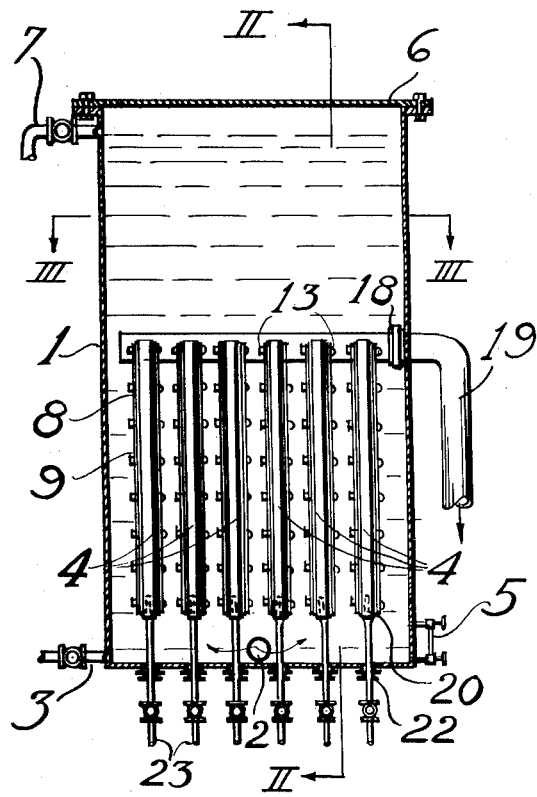
Figure 2:
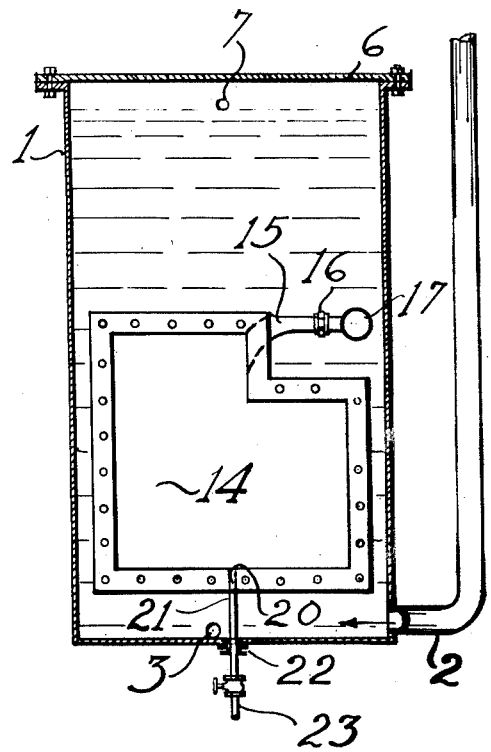
Figure 3:
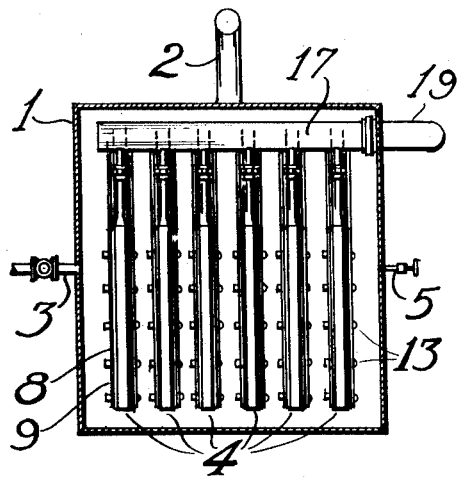
Figure 4:
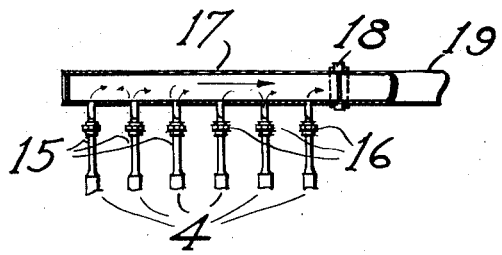

Inventor
William C. Child
Gustav A. Beiswenger
By W. E. Currie Attorney

Jan. 16, 1934.  W. C. CHILD ET AL  1,943,811
METHOD AND APPARATUS FOR FILTERING HYDROCARBON OILS
Filed June 17, 1930   2 Sheets-Sheet 2
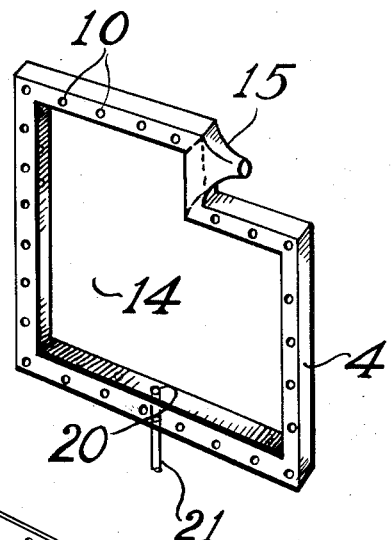
Fig.-5
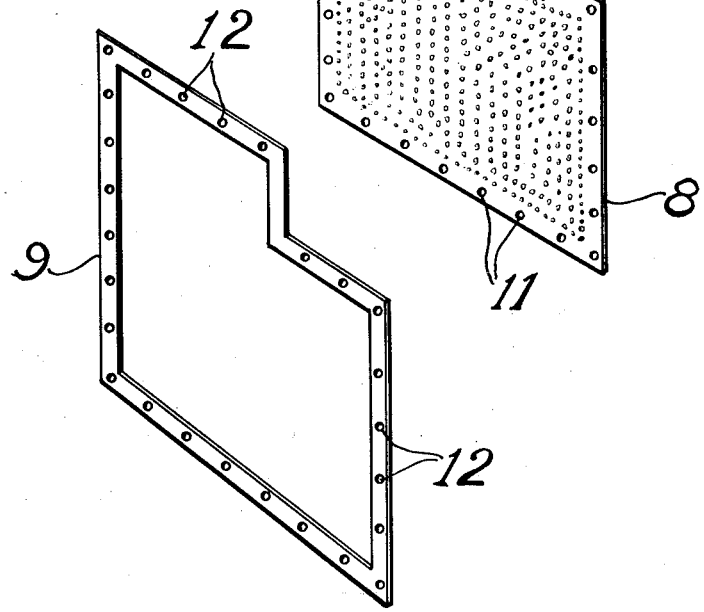
Fig.-6
Fig.-7
Inventors
William C. Child
Gustav A. Beeswenger
By
W. E. Currie Attorney Patented Jan. 16, 1934

1,943,811

UNITED STATES PATENT OFFICE 1,943,811

METHOD AND APPARATUS FOR FILTERING HYDROCARBON OILS

William C. Child, Roselle, and Gustav A. Beiswenger, Elizabeth, N. J., assignors to Standard Oil Development Company, a corporation of Delaware Application June 17, 1930. Serial No. 461,714

2 Claims. (Cl. 210—181)

This invention relates to the purification of hydrocarbon material, particularly such as is commonly used as motor or aviation fuel, and apparatus therefor.

Certain impurities in motor fuel give rise to serious difficulties in the use of the fuel, particularly in motors used in aircraft. This is especially true when the impurity consists largely or entirely of water, and it has become common practice now to filter all gasoline thru a chamois skin, or the like before filling it into an aircraft fuel tank.

The usual method of filtering the gasoline at the flying fields is to pour it thru a funnel over which has been placed a chamois skin or fine mesh screen, which permits the gasoline to pass thru into the tank while holding back any water or other impurities. This method is far from satisfactory since the time required to filter the large quantities of fuel in this way is so great as to cause serious inconvenience and economic loss.

We have found that not only can the time required for this operation be very greatly reduced but a much more efficient operation can be effected by providing a plurality of surfaces arranged in parallel in a compact space and adapted to operate under ordinary or increased pressure and so overcome one of the serious problems connected with the fueling of aircraft.

Our invention will be understood from the following description of a preferred form of our apparatus and the accompanying drawings wherein like symbols refer to similar parts throughout the drawings and in which:

Fig. I is a vertical cross section of the apparatus

Fig. II is a cross section taken on the line II II of Fig. I

Fig. III is a horizontal cross section taken on the line III III of Fig. I

Fig. IV is a horizontal cross section of the manifold for collecting the fuel

Fig. V is one of the frames for supporting the filter medium

Fig. VI is a perforated plate which supports the filter medium, and

Fig. VII is a metal strip for securing the filter medium to the plate and frame.

The apparatus which we have found most suitable for the purposes described comprises a housing 1 having an inlet 2 preferably near the bottom for the entrance thereinto of the liquid to be treated and a valved drain connection 3 for removal of water or other constituents which do not pass thru the filter elements 4. A gauge glass 5 is preferably provided at the bottom of the housing 1 to indicate the level of water collecting within the housing. In case the apparatus is to be operated under pressure it will of course be necessary to provide a suitable cover for the housing 1 as indicated at 6. In such case it is also desirable to provide a suitable air vent as we have indicated at 7.

Positioned within the housing are a plurality of filter elements each of which comprises a frame 4 on each side of which is placed a perforated plate 8 which serves as a support for the filter element. The filter element may preferably be of chamois skin or cloth or wire screen stretched over both sides of the frame 4 and plate 8, and a securing ring or frame 9.

The frames 4, plates 8 and rings 9 are provided with openings 10, 11, 12, respectively which are adapted to register for the insertion of securing bolts 13. In each frame assembly a chamber 14 is thus formed adapted to receive the fluid such as gasoline which filters thru the filter element on the rings from the housing 1.

Each frame 4 is provided with an outlet opening 15 preferably near the top of the frame and discharging thru a union connection 16 into a header 17 which is in turn connected by a union 18 with a discharge outlet 19 leading to the fuel tank or any other suitable place of disposal for the treated material. It will be understood that the header 17 is not an essential element of our invention since it can be dispensed with entirely, the discharge lines 15 being continued thru the housing in any desired manner so as to provide a plurality of discharge outlets. In such case these outlets may be directed to an accumulator tank or to an outside manifold if desired.

A drain connection 20 providing an outlet 21 from the interior of each chamber 14 is preferably provided and extends preferably thru the bottom of the casing 1 thru suitable stuffing boxes 22 terminating in the valved discharge lines 23. The pipes 20 and the manifold connection at 18 provide adequate support for the assembly within the casing 1 altho it might be desirable to provide additional supporting means in accordance with the size and weight of the apparatus used.

In operation the liquid to be purified such as motor fuel from which small amounts of water are to be removed, is supplied thru the conduit 2 to the housing 1 at the lower portion thereof either by gravity or pump pressure and rises in the casing around the filter elements 4. The gasoline will pass thru the filter elements into the chambers 14 and thence thru outlets 15 into header 17 to the discharge pipe 19. Suction may be applied to the discharge pipe 19 if desired to increase the rate of passage of liquid thru the apparatus.

Water or other impurities cannot pass thru the filter element into the discharge header and so collects in a layer in the bottom of the housing 1. At suitable intervals this layer is drained from the housing thru the drain pipe 3. Some water collects in the compartments 4 and is drained through pipes 23.

In case it is desired to clean the apparatus at any time this may be done without disturbing the parts merely by reversing the flow of fluid thru the apparatus, the drain pipe 3 serving in this case as the discharge outlet.

It will be apparent to one skilled in the art that various modifications of the principles herein described are possible and it is therefore understood that we contemplate all modifications and utilizations which come within the spirit and scope of the appended claims.

We claim:

1. Apparatus for removing water from motor fuel comprising a housing, an inlet connection for admitting fuel to be treated thereinto, a valved drain connection for removing accumulations of water therefrom, a plurality of filter elements within said housing, each filter element comprising a frame, perforated plates on each side of said frame forming a chamber therebetween, separate valved drain connection at the lower part of each chamber to discharge liquid therefrom, filtering medium secured over said plates, said frame, perforated plates and filtering medium being suitably secured together to form unitary filter elements, a manifold, discharge connections between the upper part of each said frame and said manifold, support means within said casing for suitably supporting said filter elements therein, and suitable discharge means for removing liquid from said manifold.

2. The apparatus according to claim 1 in which the filtering medium consists of chamois skin.

WILLIAM C. CHILD.
GUSTAV A. BEISWENGER.